US012220684B2

(12) United States Patent
Lee et al.

(10) Patent No.: US 12,220,684 B2
(45) Date of Patent: Feb. 11, 2025

(54) ECO-FRIENDLY SORBENT MATERIAL FOR REMOVING OIL

(71) Applicants: KANGWON NATIONAL UNIVERSITY University-Industry Cooperation Foundation, Gangwon-do (KR); Daehan Paper Co., Ltd., Chungcheongbuk-do (KR); Taekyung Polymer Co., Ltd., Gyeonggi-do (KR); CENTRE TECHNIQUE DE L'INDUSTRIE DES PAPIERS, CARTONS ET CELLULOSES, Grenoble (FR)

(72) Inventors: Myoung Ku Lee, Gangwon-do (KR); Jeong Yong Ryu, Gangwon-do (KR); Kwang Seob Lee, Gangwon-do (KR); Jae Hoon Lee, Gangwon-do (KR); Han Je Cho, Seoul (KR); Hyeok Jun Kwon, Gyeonggi-do (KR); David Guerin, Grenoble (FR); Philippe Martinez, Grenoble (FR)

(73) Assignees: KANGWON NATIONAL UNIVERSITY University-Industry Cooperation Foundation, Gangwon-do (KR); Daehan Paper Co., Ltd., Chungcheongbuk-do (KR); Taekyung Polymer Co., Ltd., Gyeonggi-do (KR); CENTRE TECHNIQUE DE L'INDUSTRIE DES PAPIERS, CARTONS ET CELLULOSES, Grenoble (FR)

( * ) Notice: Subject to any disclaimer, the term of this patent is extended or adjusted under 35 U.S.C. 154(b) by 1261 days.

(21) Appl. No.: 17/273,007

(22) PCT Filed: Jul. 26, 2018

(86) PCT No.: PCT/KR2018/008483
§ 371 (c)(1),
(2) Date: Mar. 3, 2021

(87) PCT Pub. No.: WO2019/022540
PCT Pub. Date: Jan. 31, 2019

(65) Prior Publication Data
US 2021/0322952 A1 Oct. 21, 2021

(30) Foreign Application Priority Data
Jul. 28, 2017 (KR) .......... 10-2017-0095862

(51) Int. Cl.
*B01J 20/24* (2006.01)
*B01J 2/30* (2006.01)
*B01J 20/28* (2006.01)
*B01J 20/30* (2006.01)
*B32B 23/04* (2006.01)
*B32B 37/10* (2006.01)
*C08B 3/10* (2006.01)
(Continued)

(52) U.S. Cl.
CPC ................. *B01J 20/24* (2013.01); *B01J 2/30* (2013.01); *B01J 20/28035* (2013.01); *B01J 20/28038* (2013.01); *B01J 20/2804* (2013.01); *B01J 20/3085* (2013.01); *B32B 23/04* (2013.01); *B32B 37/10* (2013.01); *C08B 3/10* (2013.01); *C09K 3/32* (2013.01); *B32B 2307/73* (2013.01); *E02B 15/101* (2013.01)

(58) Field of Classification Search
CPC ........ B01J 20/24; B01J 2/30; B01J 20/28035; B01J 20/28038; B01J 20/2804; B01J 20/3085; B32B 23/04; B32B 37/10; B32B 2307/73; C08B 3/10; C09K 3/32; E02B 15/101
USPC ......................................... 502/404
See application file for complete search history.

(56) References Cited

U.S. PATENT DOCUMENTS 6,342,268 B1    1/2002  Samain

FOREIGN PATENT DOCUMENTS

JP   2001-276610 A   10/2001
JP   2005-087863 A    4/2005
(Continued)

OTHER PUBLICATIONS

International Search Report from corresponding PCT Application No. PCT/KR2018/008483, dated Dec. 14, 2018.
(Continued)

*Primary Examiner* — Edward M Johnson
(74) *Attorney, Agent, or Firm* — Harness, Dickey & Pierce, P.L.C.

(57) ABSTRACT

Disclosed are a sorbent produced by recycling waste paper, which is an eco-friendly recycling paper resource, to adsorb and remove a marine spilled oil and other types of oil and a method of producing the same. The oil sorbent is produced by hydrophobizing a biomass material such as waste paper using a gas-grafting method. Compared to the oil sorbent of the prior art formed of synthetic resin, it is possible to provide excellent oil adsorption selectivity, a high oil adsorption rate, and a low water absorption rate. Therefore, an incineration process for processing the waste oil sorbent after use is easy advantageously. The oil sorbent generates less harmful substances during combustion because the eco-friendly material is used. Since a biomass material is hydrophobized using vegetable fatty acids, decomposition is performed fast within a short time in a landfill process, and there is no risk of environmental pollution.

7 Claims, 5 Drawing Sheets

(51) Int. Cl.
    *C09K 3/32*           (2006.01)
    *E02B 15/10*         (2006.01)

(56) References Cited

FOREIGN PATENT DOCUMENTS

| | | | | |
|---|---|---|---|---|
| JP | 2009013204 A | * | 1/2009 | |
| JP | 2010240513 A | * | 10/2010 | |
| KR | 10-2000-0055072 A | | 9/2000 | |
| KR | 10-0862043 B1 | | 10/2008 | |
| KR | 10-2016-0141920 A | | 12/2016 | |
| RU | 2519567 C2 | * | 6/2014 | ............. A61F 13/42 |
| WO | WO-2013140420 A2 | * | 9/2013 | ......... B01D 17/0202 |
| WO | WO-2015160888 A1 | * | 10/2015 | ............ B01J 20/265 |

OTHER PUBLICATIONS

Kangwon National University et al.; "Hydrophobicity of Cellulose by Gas Grafting Reaction and Development of Functional Eco-friendly Composite Material (Final Report)", Ministry of Trade industry and Energy, Jul. 15, 2017, pp. 1-195.

Lee, Myeong Gu et al., "Hydrophobicity of Cellulose by Gas Grafting Reaction and Development of Functional Eco-friendly Composite Material", The Korean Society of Industrial and Engineering Chemistry. 2014, vol. 18, No. 2.

Lee, Heung Jae. "Hydrophobicity of Cellulose by Gas Grafting Reaction and Development Technology of Functional Eco-friendly Composite Material", Polymer Science and Technology, Aug. 2017, vol. 28, No. 4, pp. 305-308.

\* cited by examiner

FIG. 4B ial for removing oil and a method of producing the same. Specifically, the present invention relates to a sorbent produced by recycling waste paper, which is an eco-friendly recycling paper resource, to adsorb and remove marine spilled oil and other types of oil and a method of producing the same.

ECO-FRIENDLY SORBENT MATERIAL FOR REMOVING OIL

CROSS REFERENCES TO RELATED APPLICATIONS

This application is a national phase entry of PCT Application No. PCT/KR2018/008483, filed on Jul. 26, 2018, which claims priority to Korean Patent Application No. 10-2017-0095862, filed on Jul. 28, 2017. The entire disclosure of the applications identified in this paragraph is incorporated herein by references.

FIELD

The present invention relates to an eco-friendly sorbent material for removing oil and a method of producing the same. Specifically, the present invention relates to a sorbent produced by recycling waste paper, which is an eco-friendly recycling paper resource, to adsorb and remove marine spilled oil and other types of oil and a method of producing the same.

BACKGROUND

Oil spills occurring at sea cause enormous economic losses to coastal ecosystems and fishermen's livelihoods depending on tidal currents, and their impact is serious. Various marine accidents have occurred along with an increase in marine transportation volume caused by expansion of the global trade scale, and in particular, serious marine environmental pollutions caused by tanker marine accidents or outflow of crude oil and various oils from offshore oil fields have emerged as a major problem. The pollution treatment methods used in the event of an oil spill are classified into three types: biological, chemical, and physical, and these methods can be used in combination as necessary. According to the general eco-friendly marine pollution control guideline, it is recommended that thick oil flowing into coastlines and sandy beaches is recovered using equipment such as a beach cleaner or a vacuum truck; the accumulated oil (bulk oil) is collected using tools such as a vacuum truck, a shovel, a bucket, or a scoop and is carried and stored in a storage container (for example, by connecting human chains); and the oil that is adjacent to the coastline and difficult to collect using human power or the tools described above is collected by adsorbing it using an oil sorbent or a material that adsorbs oil well. Some oil sorbent product groups are formed of various types of organic/inorganic and synthetic substances designed to be more suitable for oil recovery than water. The oil sorbent described above is a widely used means for oil spill control, but it may cause oil sorbent waste disposal problems due to improper or excessive use. In addition, the oil sorbent is relatively expensive so as to increase the control cost and may cause a secondary marine pollution problem because decomposition of petroleum-based synthetic substances are prolonged when the oil-sucked sorbent is lost. The oil sorbent formed of inorganic substances is inexpensive, but it is difficult to collect. The oil sorbent formed of organic substances has low oil selectivity, and thus may contain too much water. This makes it difficult to collect and imposes restrictions on incineration. As an oil sorbent formed of synthetic resin, there is known a polypropylene oil sorbent mainly produced by a melt-blown method. The polypropylene oil sorbent has a low density, which makes it easy to collect oil, and is formed of a hydrophobic substance, which provides excellent buoyancy. In addition, it can be easily collected advantageously. However, the polypropylene oil sorbent is not easily decomposed, and treatment is limited. The oil sorbents formed of organic substances include an oil sorbent formed of a plurality of natural organic substances such as straw and sawdust, and a wiper made from natural pulp in the form of non-woven fabrics. Since the oil sorbents formed of natural organic substances are naturally abundant, they are inexpensive and have good initial buoyancy when sprayed in the ocean. However, after the oil is adsorbed, they are completely wet and submerged in the sea, and thus it is difficult to collect them. The non-woven wiper (as an oil sorbent) is also widely used for removing pollutants in industrial fields. However, it is more easily absorbed to water than oil due to the hydrophilic property of cellulose. This imposes a limitation. Therefore, the oil sorbents formed of hydrophilic substances such as the organic substances described above have a poor selectivity for collecting oil and expelling water, so that there is a limitation in oil removal, and they may contain excessively much water. This may make it difficult to collect or impose restrictions on incineration. As described above, there is a limitation in the use of hydrophilic substances as the oil sorbent, and in order to overcome such disadvantages, a sorbent produced by weaving propylene yarn having a capillary structure and paper thread has been developed (see Korean Patent No. 10-0862043). This sorbent has been devised to form lattice-shaped pores and adsorption spaces through weaving to increase the adsorption, quickly absorb the initial oil to the paper, and adsorb the remaining oil to the propylene yarn having the capillary structure. However, when this sorbent is applied in a contaminated environment where water and oil mixedly exist, the oil removal efficiency may decrease because water and oil may be adsorbed at the same time. In addition, due to the water remaining in the paper thread during the incineration process, heat collection efficiency may be degraded disadvantageously. Therefore, if the oil sorbent is produced using an organic substance material that eliminates water and collects oil with improved selectivity, it is possible to improve economical oil removal efficiency, easily collect the adsorbed oil, and easily incinerate the sorbent. Such an oil sorbent may be provided to countries around the world that are building various spilled oil control systems in order to minimize damage caused by unexpected marine pollution accidents, which will lead to preoccupancy in related markets in the future.

Patent literatures and reference documents recited herein are incorporated by reference in its entirety so as to be individually and clearly specified.

CITATION LIST

Patent Literatures

Patent Literature 1: Korean Patent No. 10-0862043
Patent Literature 2: U.S. Pat. No. 6,342,268

SUMMARY

The inventors made diligent efforts to address problems of the oil sorbents of the prior art, which have poor selective absorption performance for the oil and low oil removal efficiency and are difficult to treat due to absorption of a large amount of water. The inventors accomplished the invention by developing an eco-friendly oil sorbent having excellent oil absorption selectivity by hydrophobizing a cellulose substrate, which is a hydrophilic substance having a plurality of pores, using a gas-grafting method, and experimentally finding that this oil sorbent has a low water absorption rate and an improved oil absorption rate.

Accordingly, an object of the invention is to provide an eco-friendly oil sorbent having a hydrophobized cellulose substrate.

Another object of the invention is to provide a method for producing an eco-friendly oil sorbent having a hydrophobized cellulose substrate.

According to an aspect of the present invention, there is provided an eco-friendly oil sorbent having a hydrophobized cellulose substrate.

According to an implementation of the invention, the cellulose substrate has a Gurley's air resistance of 1.5 sec/cc or lower and has a plurality of pores. In addition, the cellulose substrate has fine wrinkles at intervals of 0.1 to 3 mm to increase a surface area.

According to another implementation of the invention, the hydrophobization of the cellulose substrate is performed by using a gas-grafting method based on fatty acid chloride.

According to further another implementation of the invention, the hydrophobized cellulose substrate of the oil sorbent is laminated in two to five layers, or is pulverized to a length shorter than 5 cm for use as a filler.

According to still another implementation of the invention, the oil sorbent has a water absorption capacity of 1 g/g or smaller and an oil adsorption capacity of 4 g/g or larger.

According to another aspect of the invention, there is provided a method of producing an eco-friendly oil sorbent, the method comprising:
   a) forming fine wrinkles on a cellulose substrate;
   b) combining the cellulose substrate having the fine wrinkles; and
   c) performing hydrophobization for the combined cellulose substrate by using gas-grafting to produce the oil sorbent.

According to further another aspect of the invention, there is provided a method of producing an eco-friendly oil sorbent, the method comprising:
   a) forming fine wrinkles on a cellulose substrate;
   b) performing hydrophobization for the cellulose substrate by using gas-grafting;
   c) crushing or pulverizing the hydrophobized cellulose substrate; and
   d) filling the crushed or pulverized cellulose substrate into a non-woven fabric or the hydrophobized substrate and packaging the substrates to produce the oil sorbent.

The invention relates to a sorbent produced by recycling waste paper, which is an eco-friendly recycling paper resource, to adsorb and remove marine spilled oil and other types of oil and a method of producing the same.

The oil sorbent is produced by hydrophobizing a biomass material such as waste paper using a gas-grafting method. Compared to the oil sorbent of the prior art formed of synthetic resin, it is possible to provide excellent oil adsorption selectivity, a high oil adsorption rate, and a low water absorption rate. Therefore, an incineration process for processing the waste oil sorbent after use is easy advantageously. The oil sorbent generates less harmful substances during combustion because the eco-friendly material is used. Since a biomass material is hydrophobized using vegetable fatty acids, decomposition is performed fast within a short time in a landfill process, and there is no risk of environmental pollution. In addition, since the oil sorbent is produced using a recycled substrate (waste paper), it is inexpensive, compared to the oil sorbent of the prior art that uses synthetic resin. Since the mass production can be made using a hydrophobization device, and the production cost is reduced.

BRIEF DESCRIPTION OF THE DRAWINGS

The foregoing and additional features and characteristics of this disclosure will become more apparent from the following detailed description considered with reference to the accompanying drawings, wherein.

DETAILED DESCRIPTION

Best modes for embodying the present invention relate to eco-friendly oil sorbents having hydrophobized cellulose substrates.

According to an aspect of the present invention, there is provided an eco-friendly oil sorbent having a hydrophobized cellulose substrate.

The oil sorbent means a substance that is lipophilic but hydrophobic and has a property of attracting oil while expelling water. The oil sorbent can be classified into an adsorption type substance and an absorption type substance. The adsorption type substance attracts oil to the surface of the material, whereas the absorption type substance has a function of confining oil or other recovered substances inside the material. The oil sorbent according to the present invention means an adsorption type substance. The oil sorbent according to the present invention has a cellulose substrate. According to an embodiment of the invention, the cellulose substrate may include a base sheet obtained by recycling waste paper. The base sheet is recycled paper and may be produced by mixing any one or more selected from a group consisting of milk cartons, paper packages, paper sacks, waste newspapers, cardboards, office waste paper, waste magazines, and waste dictionary paper discarded after use.

The hydrophilic substance having a cellulose hydroxyl group has a limitation in being used as an oil sorbent as described above in the background art. Therefore, according to the present invention, hydrophobizing treatment is performed in order to use the cellulose substrate for oil adsorption. The cellulose, which is a hydrophilic substance, can provide water resistance through various reformation methods. To produce paper by most using cellulose, a sizing agent such as rosin, AKD (alkylketenedimers), and ASA (alkenylsuccinic anhydrides) is added to a slurry-like paper-making raw material, so that a fiber surface is hydrophobized during a drying process. However, the processing efficiency changes depending on the paper manufacturing environment such as pH, temperature, and retention. Basically, the hydrophobization degree is weak, and a sufficient retention time is required for the reaction. In addition, some sizing agents require a long time curing process to exhibit hydrophobization effects. Furthermore, in some cases, esters may be formed from a reaction with acids or acid anhydride compounds in the process of producing a cellulose derivative, and they may also be hydrophobized. The esters include a nitrate ester, a phosphate ester, and a sulfate ester formed of nitric acid, phosphoric acid, and sulfuric acid, or the like. In addition, the esters also include an inorganic acid ester such as a xanthogenate ester formed of carbon disulfide ($CS_2$) and an organic acid ester such as an acetic acid ester formed of acetic acid. In addition, the esters also include mixed esters such as acetate propionate used in the plastic field and acetate phthalate used in the pharmaceutical field. However, production of the ester compounds has a disadvantage that a large amount of chemicals are consumed, and they react in a liquid state, so that reaction efficiency is degraded, and a long reaction time of several hours to several hours is required disadvantageously.

According to an implementation of the present invention, hydrophobization of the cellulose substrate is performed using a gas-grafting method based on fatty acid chloride. Daniel Samain, a French scientist, has developed a new technology for hydrophobizing a hydrophilic cellulose surface based on a hydrophobization treatment of the cellulose using a gas-grafting reaction, and filed some patent application. Some of them were patented (see U.S. Pat. Nos. 6,342,268 and 8,637,119, European Patent No. 2,231,401, and US patent application Nos. 2013-0199409, 2014-0113080, and 2013-0236647).

This technique, also known as "chromatogenic technology", prevents water absorption or moisture absorption by reacting gaseous fatty acid chlorides on a hydrophilic surface containing a hydroxyl group to form fatty acid esters, as shown in the following chemical mechanism. This technique allows hydrophilic substances to be hydrophobized much faster and more efficiently than liquid reactions of the prior art. Furthermore, unlike the coating methods of the prior art, the fatty acid chloride used in the reaction is a vegetable fatty acid, which has a biodegrading effect and an eco-friendly advantage.

According to an embodiment of the invention, the cellulose substrate is hydrophobized by a printing method under the condition of a coat amount of 0.3 to 0.7 $g/m^2$ by applying a product obtained by mixing palmitoyl chloride (C16) as fatty acid chloride and stearoyl chloride (C18) at a volume ratio of 1:1 to an anilox roll engraved with 600 mesh or 1200 mesh. Preferably, the cellulose substrate according to the present invention is hydrophobized by a printing method under the condition of a coat amount of 0.4 to 0.6 $g/m^2$ by applying a product obtained by mixing palmitoyl chloride (C16) as fatty acid chloride and stearoyl chloride (C18) at a volume ratio of 1:1 to an anilox roll engraved with 700 mesh or 1100 mesh. More preferably, the cellulose substrate according to the present invention is hydrophobized by a printing method under the condition of a coat amount of 0.5 $g/m^2$ by applying a product obtained by mixing palmitoyl chloride (C16) as fatty acid chloride and stearoyl chloride (C18) at a volume ratio of 1:1 to an anilox roll engraved with 800 mesh or 1000 mesh.

According to another embodiment of the present invention, the temperature of the anilox roll (gravure) was fixed at 40 to 80° C., and the temperature of the two drying rolls was adjusted to 180 and 220° C. In addition, the temperature of the hot air for air-knife flushing was adjusted to 250 to 350° C. Preferably, the temperature of the anilox roll (gravure) was fixed at 50 to 70° C., and the temperature of the two drying rolls was adjusted to 190 and 210° C. In addition, the temperature of the hot air for air-knife flushing was set to 300° C. More preferably, the temperature of the anilox roll (gravure) was fixed at 60° C., and the temperature of the two drying rolls was adjusted to 200° C. In addition, the temperature of the hot air for air-knife flushing was set to 300° C. Under the treatment condition described above, hydrophobization was performed by fixing the operating speed of the device at 50 m/min, and then, a roll-shaped oil sorbent material was produced. Unlike the coating methods known in the art, the cellulose substrate obtained by the method described above is hydrophobized by forming an ester bonding by reacting the hydroxyl group of cellulose with the fatty acid. Therefore, physical properties of the cellulose such as a pore property and thickness do not change advantageously.

The eco-friendly oil sorbent having the hydrophobized cellulose substrate according to the present invention has a plurality of pores, where oils permeate and are adsorbed by osmotic pressure, so that oils can be removed just by covering the substrate on the sea where the oil spill occurs. The pores are determined by the physical properties of the cellulose substrate. Since the hydrophobized cellulose according to the present invention is hydrophobized by using the gas-grafting method, the pores of the cellulose are maintained, and the adsorption effect for oils is excellent advantageously.

According to an implementation of the invention, the cellulose substrate has a Gurley's air resistance of 1.5 sec/cc or lower, and has a plurality of pores. The Gurley's air resistance is an index regarding the air permeability measured by the Gurley's method for the cellulose substrate. When the air resistance exceeds 1.5 sec/cc, the size of the pore is too small to allow oils to permeate, so that the oil removal efficiency decreases disadvantageously.

The oil removal efficiency of the oil sorbent is proportional to the size of the surface area coming into contact with the oil.

According to an implementation of the invention, fine wrinkles are formed at intervals of 0.1 to 3 mm by using a wrinkle generator of the drying unit in order to increase the surface area of the oil sorbent. Preferably, the fine wrinkles may be formed at intervals of 1 to 2 mm, and more preferably, at intervals of 0.5 to 1 mm. If the interval between the fine wrinkles is smaller than 0.1 mm or larger than 3 mm, the surface improvement effect caused by the wrinkles is insignificant.

According to an implementation of the invention, the oil sorbent may be produced by laminating the hydrophobized cellulose substrates in two to five layers, or may be produced by pulverizing the hydrophobized cellulose substrate into a length shorter than 5 cm for use as a filler.

According to another implementation of the invention, the oil sorbent produced by lamination may be formed by combining several cellulose substrates having fine wrinkles and performing embossing having various unevenness forms (press-molding bonding process). If the oil sorbent is produced in multiple layers, an oil adsorption capacity is improved because a space for adsorbing the oil is provided between the layers.

According to an implementation of the invention, the oil sorbent may be formed by laminating hydrophobized cellulose substrates in two to five layers. Preferably, the hydrophobized cellulose substrate may be formed by laminating four layers. If the lamination is not performed as described above, the oil adsorption capacity does not improve because there is no storage space for the oil between the layers. If the number of layers exceeds five, the thickness increases, so that it is difficult to manufacture the roll, and the oil sorbent becomes heavy and inefficient to remove when adsorbing oil.

According to an implementation of the invention, the lamination of the oil sorbent improves the surface area and the bonding force by using the press-molding bonding method. The press-molding bonding method (embossing) improves a cohesive force between the layers and durability and increases the surface area, which improves the oil adsorption efficiency.

According to an implementation of the invention, the oil sorbent may be formed by pulverizing the hydrophobized cellulose substrate into a length shorter than 5 cm for use as a filler. The oil sorbent of the prior art is produced by using hydrophobic synthetic resin or the like. The hydrophobic oil sorbent of the prior art has a limitation, and a technique for overcoming such a limitation by using paper thread having a capillary effect has been disclosed. However, the hydrophilicity of the paper thread degrades the oil collection selectivity disadvantageously. In comparison, according to the present invention, the hydrophobized cellulose substrate is pulverized and is then use as a filler instead of the paper thread. The filler produced by pulverizing the hydrophobized cellulose substrate may be preferably pulverized to a length shorter than 3 cm, and more preferably, defiberated to 0.1 to 5 mm fibers. If the hydrophobized cellulose substrate is produced in a small size and is used as the filler, the surface area that can come into contact with oil increases, so that the oil adsorption capacity increases. In particular, if the hydrophobized cellulose substrate is pulverized and produced in a fiber state, the water absorption capacity decreases, and the oil adsorption capacity increases advantageously.

According to an implementation of the invention, the water absorption capacity of the oil sorbent is 1 g/g or smaller, and the oil adsorption capacity is 4 g/g or larger.

According to another aspect of the present invention, there is provided a method of producing an eco-friendly oil sorbent having the following steps:
 a) forming fine wrinkles on a cellulose substrate;
 b) combining the cellulose substrates having the fine wrinkles; and
 c) producing an oil sorbent by hydrophobizing the combined cellulose substrates through gas-grafting.

The fine wrinkles increase the surface area of the cellulose substrate and the oil adsorption capacity advantageously. The bonding of the cellulose substrates may be performed by using an embossing method in which two to five layers of the cellulose substrates are bonded. The bonded cellulose substrates are hydrophobized by performing gas-grafting based on fatty acid chloride. A perforation line may be added to the hydrophobized substrate, and the substrates may be produced in a multi-layered roll shape or may be produced in a multi-layered plate structure through cutting.

According to further another aspect of the present invention, there is provided a method of producing an eco-friendly oil sorbent having the following steps:
 a) forming fine wrinkles on a cellulose substrate;
 b) performing hydrophobization for the cellulose substrate using gas-grafting;
 c) crushing or pulverizing the hydrophobized cellulose substrate; and
 d) filling the crushed or pulverized cellulose substrate into the inside of a non-woven or hydrophobized substrate and packaging the substrates to produce the oil sorbent.

The hydrophobized cellulose substrate may be produced by using a method similar to that of another aspect of the invention described above. The cellulose substrate may be pulverized to a length shorter than 5 cm and may be used as a filler. The filler produced by pulverizing the hydrophobized cellulose substrate may be preferably pulverized into a length shorter than 3 cm, more preferably, defiberated to 0.1 to 5 mm fibers. The filler may be filled between biodegradable non-woven fabrics or hydrophobized cotton fabrics, and they may be packaged in a cushioned, mini-boom, or powdered form.

EXAMPLES

Example 1: Production of Hydrophobized Laminated Matt Type Oil Sorbent Cloth

1) Production of Hydrophobized Oil Sorbent Material

Figure 1A:
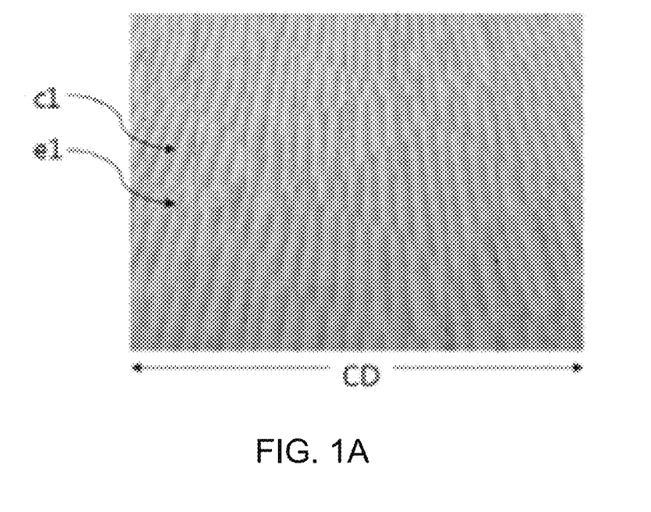
FIGS. 1A and 1B illustrate a panel A having fine wrinkles formed on a cellulose substrate and a panel B produced by performing an embossing sheet bonding process.
Figure 1B:
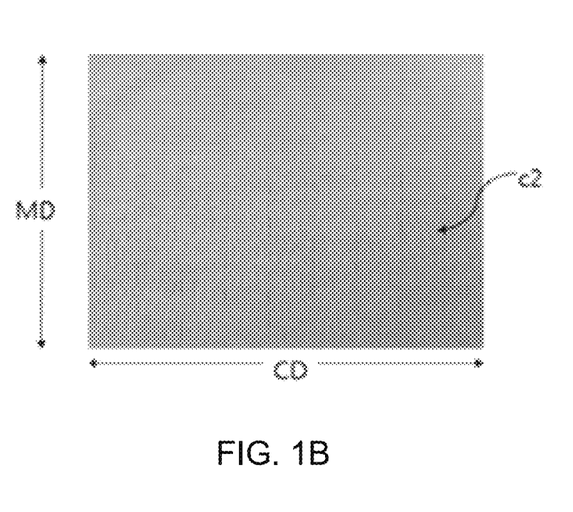
Figure 2:
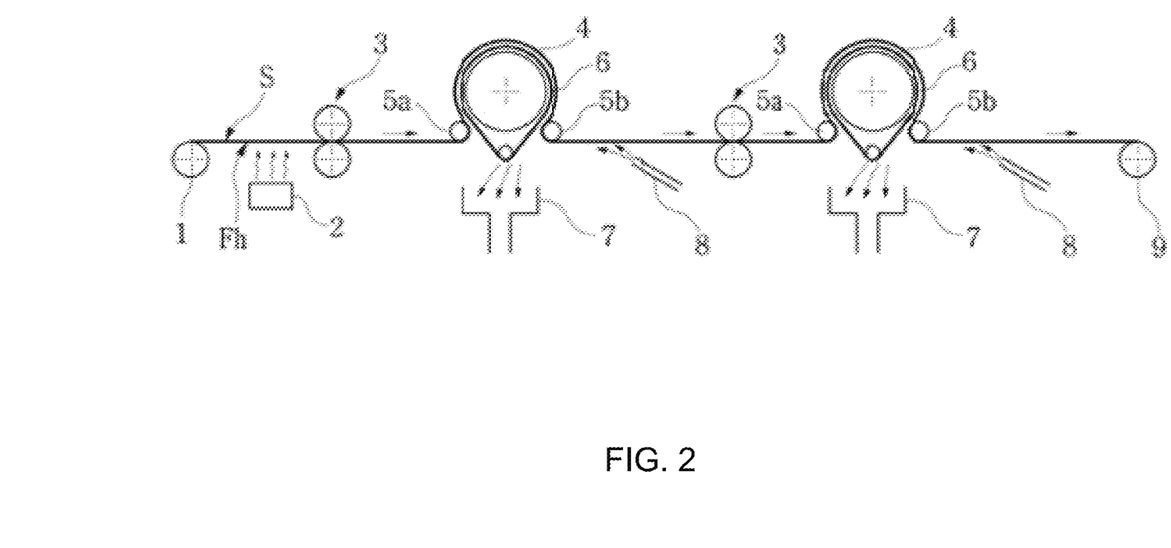
FIG. 2 is an schematic diagram illustrating a device for hydrophobizing a substrate using a gas-grafting reaction based on fatty acid chlorides.
Figure 3A:
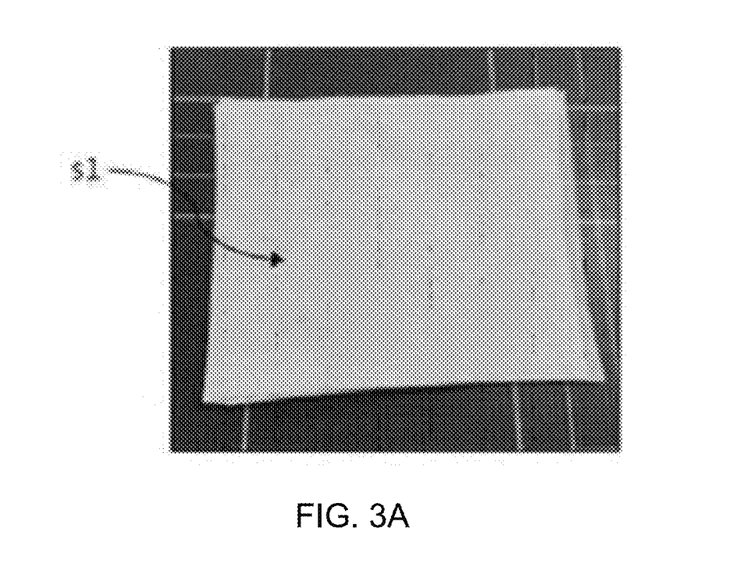
FIGS. 3A, 3B, 3C and 3D illustrate a filling material used for an oil sorbent filler.
Figure 3B:
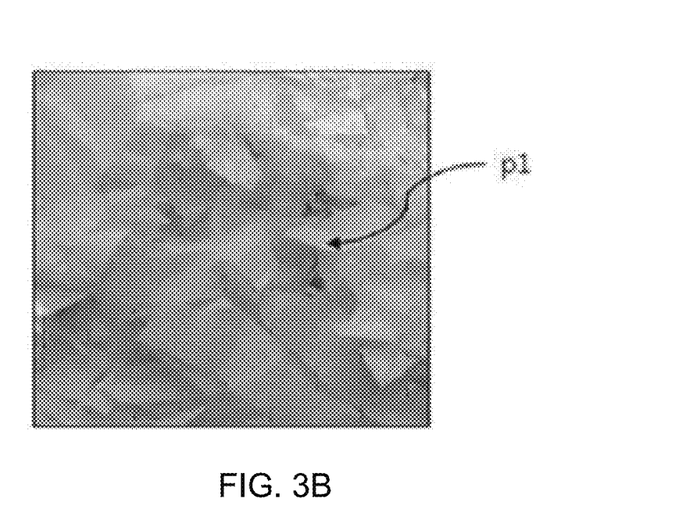
Figure 3C:
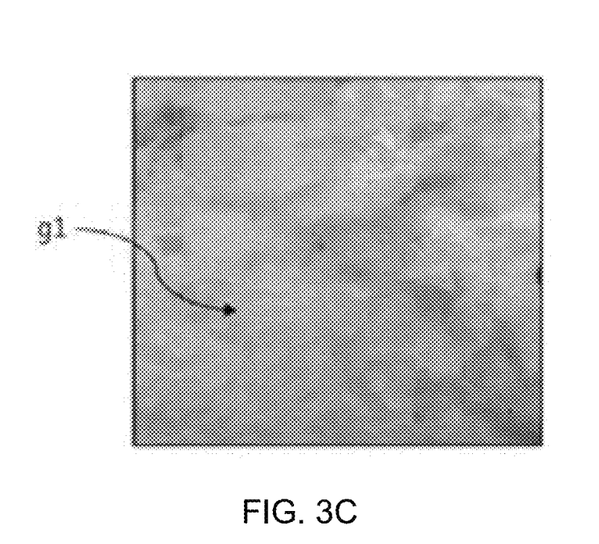
Figure 3D:
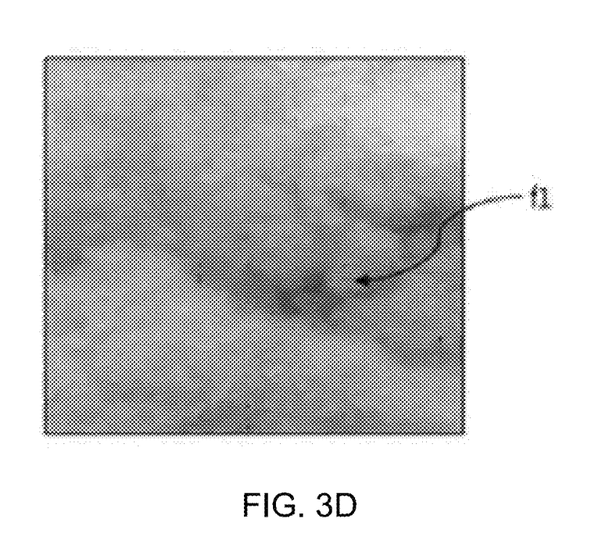
Figure 4A:
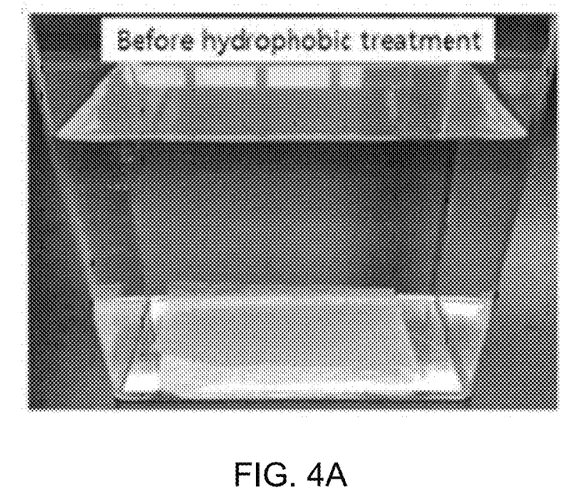
FIGS. 4A and 4B are photographs taken by floating an unhydrophobized oil sorbent and a hydrophobized oil sorbent subjected to a gas-grafting reaction based on fatty acid chloride.
Figure 4B:
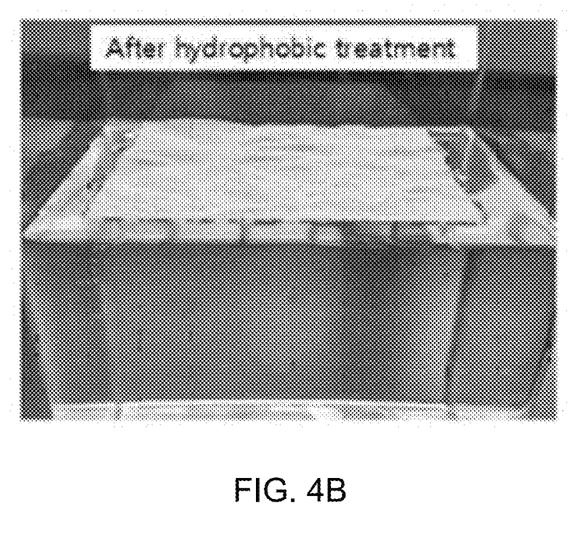

Since cellulose fibers are hydrophilic, it is difficult to use as an oil sorbent. According to the present invention, hydrophilic cellulose fibers were hydrophobized by gas-grafting with fatty acid chloride. The cellulose fiber material for producing the oil sorbent has a Gurley's air resistance of 1.5 seconds per 100 cc or less, and has a paper roll shape having a plurality of pores. In this case, a natural pulp fiber containing a hydroxyl group or a recycled pulp fiber from which foreign substances are removed through a selection process may used as the fiber. FIG. 1 illustrates a panel A having fine wrinkles formed on a cellulose substrate and a panel B produced by performing an embossing sheet bonding process, in which "c1" refers to fine wrinkles formed at intervals of 1 to 2 mm, and "c2" refers to fine wrinkles formed at intervals of 0.5 to 1 mm. The paper type used as the materials described above includes a kitchen towel base sheet and a hand towel base sheet having a basis weight of 40 g/m$^2$, and as illustrated in FIG. 1, the surface area increases by forming fine wrinkles on the surface (see "c1" and "c2" of Panel A and B of FIG. 1). For the single-layered base sheet having the roll shape, a three-layer, four-layer, or five-layer paper bonding process was performed depending on the application. In this case, embossing based on a press-molding bonding method was applied to strengthen a bonding force between each base sheet (see Panel A of FIG. 1). Hydrophobization treatment was performed for the roll bonded using a fatty acid chloride gas-grafting device shown in FIG. 2 (manufactured by "T company" as a pattern release paper manufacturer located at a Dongducheon, Gyeonggi-do, South Korea). FIG. 2 is an schematic diagram illustrating a device for hydrophobizing a substrate using a gas-grafting reaction based on fatty acid chlorides, in which the fatty acid chlorides gas-grafting device is a device similar to that of the prior art shown in FIG. 4 of the reference literature (Korean Patent Application No. 2016-0141920), in which the reference symbol "S" denotes a substrate, the reference numeral "1" denotes an unwinder for continuously supplying the substrate S, the reference numeral "2" denotes a drying unit for heating and drying a surface of the substrate where hydroxyl groups are exposed, the reference numeral "3" denotes a coat roller for applying and coating a gas-grafting reagent to the surface of the substrate where the hydroxyl groups are exposed, the reference numeral "4" denotes a drying roller, the reference numerals "5a" and "5b" denote touch rolls, the reference numeral "6" denotes a belt which is provided between the drying roller and the substrate and rotates around a peripheral surface of the drying roller, the reference numeral "7" denotes a ventilation fan, the reference numeral "8" denotes an air-knife nozzle, the reference numeral "9" denotes a rewinder unit, and the reference symbol "Fh" denotes a surface of the substrate where hydroxyl groups are exposed for the gas-grafting treatment. A product obtained by mixing palmitoyl chloride (C16) and stearoyl chloride (C18) as fatty acid chloride at a volume ratio of 1:1 was applied to an anilox roll engraved with 800 mesh or 1000 mesh and was printed on an oil sorbent substrate bonded under the condition of a coat amount of 0.5 g/m². The temperature of the anilox roll (gravure) was fixed at 60° C., the temperature of the two drying rolls was adjusted to 200° C. In addition, the temperature of the hot air for air-knife flushing was set to 300° C. Hydrophobization was performed under the aforementioned treatment condition by fixing the operating speed of the device at 50 m/min, and then, the oil sorbent material having a roll shape was produced.

2) Shaping of Hydrophobized Lamination Matt Type Oil Sorbent Cloth

Using the three-layered, four-layered, or five-layered roll type oil sorbent material described above, laminated matt type oil sorbent clothes of Examples 1-1, 1-2, and 1-3 were produced, respectively. The oil sorbent clothes described above were fabricated to a roll shape or a multi-layered plate shape.

For the laminated matt type oil sorbent cloth having a roll shape, the sheets are bonded through embossing in which the hydrophobized roll is press-molded. In this case, after performing a process of forming a perforation line depending on use purposes, a certain length was wound around a paper tube, and cut with a circular rotary saw to produce a small roll-shaped oil sorbent cloth. Alternatively, in order to produce an oil sorbent cloth having a large roll shape, a large roll having a width of 1.2 m was cut while rewinding (slitting process), and was wound around a paper tube for commercialization.

In order to produce a laminated matt type oil sorbent cloth having a multi-layered plate structure, the hydrophobized roll was unwound and overlapped, and bonding was performed through embossing bonding. Then, the bonded material was cut and piled up to a specified number of layers, cut to a desired size, and packaged in a carton (box).

Example 2: Production of Hydrophobized Cushion Type Oil Sorbent Cloth

1) Production of Hydrophobized Oil Sorbent Filler

A hydrophobic oil sorbent material was produced by performing hydrophobization using a method similar to that of production of the oil sorbent material of Example 1 described above. First, the hydrophobic oil sorbent material was produced in a laminated shape (s1 of Panel A in FIG. 3), and was produced as an oil sorbent filler through a pulverization process in which the material was pulverized to a size of 3 cm by 3 cm using a shredder, a cutting mixer, a slicer, or the like (p1 of Panel B of FIG. 2 (paper scrap) and g1 of Panel C of FIG. 3 (pulverization)). FIG. 3 illustrates a filling material used for an oil sorbent filler, in which the reference symbol "s1" of the panel A denotes a four-layered oil sorbent cloth produced according to an embodiment of the invention, the reference symbol "p1" of the panel B denotes a paper scrap type oil sorbent filler cut to a size of 3 cm by 3 cm according to an embodiment of the invention, the reference symbol "g1" of the panel C denotes a pulverized type oil adsorbing filer crushed at a size of 3 cm by 3 cm according to an embodiment of the invention, and the reference symbol "f" of the panel D denotes a dry defiberation type oil sorbent filler according to an embodiment of the invention. In order to provide an effective adsorption capability, the shredded material was subjected to dry defiberation using a crusher such as a cutting mill or a hammer mill to produce an oil sorbent filler in a fiber form having a length of 0.5 to 3 mm ("f1" of Panel B of FIG. 3). The produced oil sorbent fillers (p1, g1, and f1) were filled into a cushion type biodegradable non-woven fabric and a hydrophobized cotton fabric and were sealed to produce an oil sorbent cloth. Depending on the type of the filler, the paper scrap type filler (p1 of Panel B of FIG. 3) was classified into Example 2-1, the pulverized type filler g1 of Panel C of FIG. 3) was classified into Example 2-2, and the dry defiberation type filler (f1 of Panel D of FIG. 3) was classified into Example 2-3.

Comparative Example 1: Unhydrophobized Laminated Matt Type Oil Sorbent Cloth

The paper type used for the oil sorbent material in Comparative Example 1 is a kitchen towel base sheet and a hand towel base sheet having a basis weight of 40 g/m². The single-layered base sheet having a roll shape was subjected to a bonding process for forming a three-layered or four-layered shape. In this case, embossing as a press-molding bonding method was applied to more strengthen the bonding force between base sheets. The laminated matt type oil sorbent cloth of Comparative Example 1 was produced by a method similar to that of the laminated matt type oil sorbent cloth of Example 1 described above, except that the base sheet was not hydrophobized.

Comparative Example 1: Unhydrophobized Cushion Type Oil Sorbent Cloth

The paper type used for the oil sorbent material in Comparative Example 2 is a kitchen towel base sheet and a hand towel base sheet having a basis weight of 40 g/m² which is equal to that of Example 1. The oil sorbent material was produced as an oil sorbent filler (pulverized type) through a pulverization process in which the material was pulverized to a size of 3 cm by 3 cm using a shredder, a cutting mixer, a slicer, or the like. The laminated matt type oil sorbent cloth of Comparative Example 2 was produced by a method similar to that of the laminated matt type oil sorbent cloth of Example 2 described above, except that the base sheet was not hydrophobized.

Experimental Example: Test for Water Absorption Capacity and Oil Adsorption Capacity of Oil Sorbent The oil sorbent clothes of Examples and Comparative Examples described above were cut into test pieces having a size of 10 cm by 10 cm, and their weights and volumes were measured. Then, they were floated on distilled water having a temperature of 2012° C., and were shaken horizontally with an amplitude of 4 cm. They were left on a wire net for five minutes, and their masses were measured to calculate the water absorption capacity per mass of 1 g and per volume of 1 cm³. The oil sorbent clothes of Examples and Comparative Examples described above were cut into test pieces having a size of 10 cm by 10 cm, and their weights and volumes were measured. Then, they were floated on the surface of the oil having a temperature of 20° C., and were left for five minutes. Then, the oil sorbent clothes were picked up and left on a wire net for five minutes, and their masses were measured. Then, the water absorption capacity per mass of 1 g and per volume of 1 cm³ of the test pieces was calculated.

Table 1 shows a result of comparison for the water absorption capacity and the oil adsorption capacity between the laminated matt type oil sorbent clothes of Comparative Example 1, Examples 1-1, 1-2, and 1-3.

TABLE 1

|  | basic physical properties | | | water absorption capacity | | oil adsorption capacity (high viscosity oil) | |
| --- | --- | --- | --- | --- | --- | --- | --- |
|  | number of layers | basis weight (g/m$^2$) | thickness (μm) | g/g | g/cm$^3$ | g/g | g/cm$^3$ |
| Comparative example 1 | three | 130 | 348 | 4.124 | 1.549 | 5.379 | 2.000 |
| Example 1-1 | three | 130 | 324 | 0.847 | 0.606 | 5.630 | 2.250 |
| Example 1-2 | four | 177 | 432 | 0.635 | 0.256 | 4.919 | 2.016 |
| Example 1-3 | five | 203 | 572 | 0.372 | 0.160 | 4.528 | 1.824 |

Referring to Table 1, it is recognized that the water absorption capacity of the hydrophobized and bonded oil sorbent clothes (Examples 1-1, 1-2, and 1-3) were remarkably small in comparison with the unhydrophobized oil sorbent cloth (Comparative Example 1). This result means that the surfaces of the oil sorbent clothes are hydrophobized through gas-grafting based on fatty acid chloride. In addition, comparing Comparative Example 1 and Example 1-1 having a three-layered structure, it is recognized that the oil adsorption properties are nearly constant regardless of whether or not hydrophobization is performed.

Table 2 shows a result of comparing the water absorption capacity and the oil adsorption capacity for a pad type oil sorbent cloth obtained by pulverizing an unhydrophobized paper material and using it as a filler (Comparative Example 1), a laminated matt type oil sorbent cloth produced by three layers and hydrophobizing them (Example 1-1), and pad type oil sorbent clothes produced by changing the size of the filler (Examples 2-1, 2-2, and 2-3).

TABLE 2

|  | | hydro-phobization | filler (cellulose) | water absorption capacity (g/g) | oil adsorption capacity (g/g) (low viscosity oil) | oil adsorption capacity (g/g) (high viscosity oil) |
| --- | --- | --- | --- | --- | --- | --- |
| Comparative example 2 | cushion type oil sorbent cloth | unhydrophobized | pulverized type (g1) | 3.924 | 8.224 | 9.425 |
| Example 1-1 | laminated matt type | hydrophobized | — | 0.925 | 4.188 | 5.125 |
| Example 2-1 | cushion type oil sorbent cloth | hydrophobized | paper scrap type (p1) | 0.677 | 7.519 | 6.955 |
| Example 2-2 | cushion type oil sorbent cloth | hydrophobized | pulverized type (g1) | 0.530 | 8.380 | 9.527 |
| Example 2-3 | cushion type oil sorbent cloth | hydrophobized | dry defiberation type (f1) | 0.541 | 9.691 | 10.556 |

Referring to Table 2, it is recognized that the cushion type oil sorbent clothes (Examples 2-1, 2-2, and 2-3) produced by controlling the size of the filler after hydrophobization have remarkably small water absorption capacities in comparison with the pad type oil sorbent cloth produced by pulverizing the unhydrophobized paper material and using it as a filler (Comparative Example 2). In addition, it is recognized that the oil adsorption capacity increases as the size of the filler decreases, and efficiency improves as the oil viscosity increases. It is considered that this is because the oil adsorption capacity increases as the surface area of the oil sorbent filler increases. It is considered that, in the case of the high viscosity oil which is difficult to flow to the adsorbing material fast, the efficiency is determined to be high depending on the external surface area of the oil sorbent.

Specific embodiments described herein are representative of preferable implementations or exemplifications of the present invention, and the scope of the invention is not limited thereby. Those skilled in the art would appreciated that further modifications and applications may be possible without departing from the spirit and scope of the invention as defined in claims and their equivalents.

What is claimed is:

1. An eco-friendly oil sorbent comprising a hydrophobized cellulose substrate,
    wherein the cellulose substrate has fine wrinkles at intervals of 0.1 to 3 mm to increase a surface area.

2. The eco-friendly oil sorbent according to claim 1, wherein the cellulose substrate is hydrophobized by using a gas-grafting method based on fatty acid chloride.

3. The eco-friendly oil sorbent according to claim 1, wherein the cellulose substrate has a Gurley's air resistance of 1.5 sec/cc or lower and has a plurality of pores.

4. The eco-friendly oil sorbent according to claim 1, wherein the hydrophobized cellulose substrate of the oil sorbent is aminated in two to five layers.

5. The eco-friendly oil sorbent according to claim 1, wherein the lamination of the oil sorbent increases the surface area and improves a bonding force by using a press-molding bonding method.

6. The eco-friendly oil sorbent according to claim 1, wherein the oil sorbent is obtained by pulverizing the hydrophobized cellulose substrate into a length shorter than 5 cm for use as a filler.

7. The eco-friendly oil sorbent according to claim 1, wherein the oil sorbent has a water absorption capacity of 1 g/g or smaller and an oil adsorption capacity of 4 g/g or larger.

* * * * *